(12) United States Patent
Yang

(10) Patent No.: US 7,315,090 B2
(45) Date of Patent: Jan. 1, 2008

(54) SERIES-PARALLEL DUAL POWER HYBRID DRIVING SYSTEM

(76) Inventor: Tai-Her Yang, No. 59, Chung Hsing 8 St., Si-Hu Town, Dzan Hwa (TW)

( * ) Notice: Subject to any disclaimer, the term of this patent is extended or adjusted under 35 U.S.C. 154(b) by 0 days.

(21) Appl. No.: 11/087,681

(22) Filed: Mar. 24, 2005

(65) Prior Publication Data

US 2005/0161268 A1  Jul. 28, 2005

Related U.S. Application Data

(63) Continuation-in-part of application No. 10/364,391, filed on Feb. 12, 2003, now abandoned.

(51) Int. Cl.
*B60K 6/00* (2006.01)
(52) U.S. Cl. .................................... 290/40 C
(58) Field of Classification Search ............. 290/40 C, 290/17; 180/65.2; 477/5
See application file for complete search history.

(56) References Cited

U.S. PATENT DOCUMENTS

| | | | |
|---|---|---|---|
| 5,786,640 A | 7/1998 | Sakai et al. | |
| 5,845,731 A | 12/1998 | Buglione et al. | |
| 6,026,921 A * | 2/2000 | Aoyama et al. | 180/65.2 |
| 6,059,059 A * | 5/2000 | Schmidt-Brucken | 180/65.3 |
| 6,209,672 B1 | 4/2001 | Severinsky | |
| 6,278,289 B1 * | 8/2001 | Guccione et al. | 326/40 |
| 6,336,063 B1 * | 1/2002 | Lennevi | 701/22 |
| 6,394,209 B1 * | 5/2002 | Goehring et al. | 180/65.4 |
| 6,563,230 B2 * | 5/2003 | Nada | 290/40 C |
| 6,570,265 B1 * | 5/2003 | Shiraishi et al. | 290/40 C |
| 6,608,396 B2 | 8/2003 | Downer et al. | |
| 6,692,405 B2 * | 2/2004 | Minowa et al. | 477/5 |
| 6,740,002 B1 * | 5/2004 | Stridsberg | 477/14 |
| 6,808,470 B2 * | 10/2004 | Boll | 477/6 |
| 6,886,648 B1 * | 5/2005 | Hata et al. | 180/65.2 |
| 2002/0109357 A1 * | 8/2002 | Lilley et al. | 290/40 C |
| 2003/0205422 A1 * | 11/2003 | Morrow et al. | 180/65.2 |

FOREIGN PATENT DOCUMENTS

| | | |
|---|---|---|
| DE | 19945449 A1 * | 3/2000 |
| DE | 10246839 A1 * | 4/2004 |
| EP | 965475 A2 * | 12/1999 |
| EP | 1097830 | 5/2001 |
| FR | 2809352 | 11/2001 |
| GB | 2316376 A * | 2/1998 |

* cited by examiner

*Primary Examiner*—Joseph Waks
(74) *Attorney, Agent, or Firm*—Rabin & Berdo, P.C.

(57) ABSTRACT

A series-parallel dual power hybrid driving system is characterized by integrating the advantages of a series-connected hybrid driving system and the advantages of a parallel-connected hybrid driving system. It permits an engine to run at high power and high speed for normal or high load driving. Under low-power, low-speed light loading conditions the system operates in a series hybrid driving configuration to avoid low efficiency and high pollution by the engine.

7 Claims, 1 Drawing Sheet

SERIES-PARALLEL DUAL POWER HYBRID DRIVING SYSTEM

CROSS-REFERENCES TO RELATED APPLICATIONS

This application is a Continuation-In-Part of my patent application Ser. No. 10/364,391, filed Feb. 12, 2003 now abandoned.

BACKGROUND OF THE INVENTION (a) Field of the Invention

The present invention is related to an innovation characterized by integrating the advantage of a series-connected hybrid driving system and the advantage of a parallel-connected hybrid driving system; under normal loading condition, it enable an engine running with high speed and high power to drive a load, and specifically, in the condition of low-power, low-speed light-load driving, it drives the light load by means of its series-connected hybrid driving system with less power generating, under this operating mode, the electric storage device (E.S.D.) is isolated from system operation to reduce the capacity demand of E.S.D.

(b) Description of the Prior Art

Conventionally, single power systems are used in vehicles on land, at sea or in air. In recent years, owing to the consideration of energy saving and pollution control, dual power drive systems have attracted significant R&D investments, particularly in the areas of a hybrid drive system which integrating an internal combustion engine and a motor driven by electrical power from E.S.D. Various developed dual power drive systems are as follows:

1. A full-powered series-connected hybrid system: An engine is used to drive a generator which carries approximate power capacity to the engine, then under the control of drive control unit, the load is driven by a motor which also carries approximate power capacity to the engine, the motor is driven by the electricity generated by the generator; the drawback of the system is that, given various full load rates, efficiency differs excessively; and the power of engine does not support for direct load driving, Since the electricity from generator, under the control of drive control unit is transferred to the motor unit for load driving, therefore the power capacity of generator and motor unit must satisfying the demand of maximum power output. Therefore each of the engine, generator and motor unit must fulfill the demand of system maximum output power capacity, therefore the weight and cost is getting high, and the power of engine is unable to provide direct load driving while electrical units failed.

2. An energy-storing series-connected hybrid system: An engine is used to drive a generator, then, under the control of Drive Control Unit (D.C.U.), the load is driven by a motor that is, driven by the electricity generated by the generator; under light load conditions, part of the electricity generated by the generator is transferred into E.S.D. for storage, and the electricity stored in the E.S.D. is used to drive the motor to drive the load when the engine stops; and under heavy loading condition, the electrical energy from E.S.D. and generator jointly transferred to the motor unit for load driving. This architecture requires the installation of E.S.D, and the power from engine doesn't support directly load driving, therefore the power capacity of motor must satisfy the demand of system maximum output, and the capacity of generator shall be reduced with the installation of E.S.D, the power of engine is unable to offer load driving while electrical units failed.

3. A parallel-connected drive system: An engine is used to directly drive the load, whereas a generator is driven to charge E.S.D. at light load, so that once the engine stops, the electricity stored in the E.S.D. is used to drive the motor to drive the load; under heavy load conditions, the load is jointly driven by the engine as well as the motor driven by the electricity of the E.S.D.; the drawback of the system is that it is necessary to install E.S.D. of sufficient capacity, and high cost.

SUMMARY OF THE INVENTION

The present invention is related to an innovation characterized by integrating the advantage of a series-connected hybrid driving system and the advantage of a parallel-connected hybrid driving system with the deployment of E.S.D. Not only does it enable an engine running with high power and high speed to drive a load through its parallel-connected hybrid driving system. Under the various operating configurations of present system, while the load is driven under a low-power, low-speed light loading condition, the power from E.S.D. is transferred to motor for load driving, or the E.S.D. is embedded in various operating mode of the series-connected hybrid driving system. The feature of the present system is to specifically setting the clutch unit 102 disengaged (open) between the first electrical unit 101 and the second electrical unit 103 and letting the Internal Combustion Engine (I.C.E.) units to running in high efficiency region to drive the first electrical unit to function as a generator's operation. Electricity by the generator is used to drive the second electrical unit to function as a motor for driving a light or medium loading in the form of a series connected hybrid driving configuration. Under the operation of this configuration, the E.S.D. is eliminated from system operation for reducing the capacity demand of E.S.D.

DETAILED DESCRIPTION OF THE PREFERRED EMBODIMENTS

Figure 1:
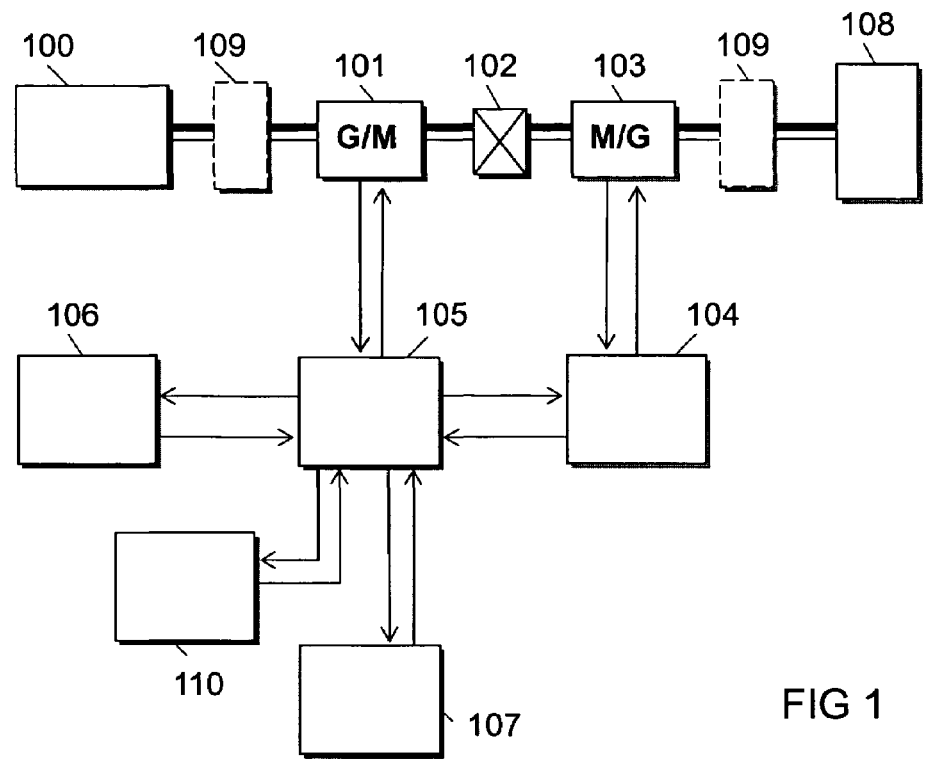
FIG. 1 is a block chart of a preferred embodiment of the present invention.

Referring to FIG. 1 for one of the block charts of the system in accordance with the present invention, wherein, in the present series-parallel dual power hybrid driving system, an engine shaft, the shaft of the first electrical unit, and the shaft of the second electrical unit are connected in series, and the structure comprising:

an engine unit 100 implemented by various types of Internal Combustion Engines (I.C.E.) in use; utilizing various types of fuels and equipped various peripheral devices, the output shaft of I.C.E. is connected to the input end of the rotary shaft of the first electrical unit 101; and, the first electrical unit 101 that comprises AC or DC, brushless or brushed rotary electric machines, functioning as a generator, or capable of being converted to a generator or a motor in terms of its function; one end of the rotary shaft is driven by the I.C.E. unit 101, and the other end of the rotary shaft is connected to the input end of clutch unit 102;

a clutch 102 controlled manually, mechanically, pneumatically or oil-hydraulically, or controlled by an electromagnetic force, to enable (close) or interrupt (open) transmission of rotary mechanical energy;

the second electrical unit 103 that comprises AC or DC, brushless or brushed rotary electric machines, functioning as a motor, or capable of being converted to a motor or a generator in terms of its function; the input end of the rotary shaft is driven by the clutch unit 102, and the other end of the rotary shaft is connected to the load 108;

a drive control unit 104 to perform full or partial of the functions listed below: the engage or disengage of clutch unit 102; or to control the output status of first electrical unit 101 functioning as a generator to charge the E.S.D. unit 106, or to control one or both of the electrical energy from E.S.D. unit 106 or first electrical unit 101 for individually or jointly drive the second electrical unit 103, or to control rotating direction, rotational speed, torque and amperage of the second electrical unit 103 functioning as a motor; or to control the first electrical unit 101 to function as a motor, or to control both or one of the first electrical unit 101 or second electrical unit 103 to function as motor for regenerative breaking to recharge the E.S.D. 106;

a central control unit 105 composed of solid-state or electromechanical devices, or chips, and related software for receiving the control from a manual control interface 107 to control the operation of the present series-parallel dual power hybrid driving system, and for controlling the drive control unit 104 that drives the first electrical unit 101, the second electrical unit 103, the clutch unit 102, the E.S.D. unit 106, and I.C.E. unit 100, and controlling the feedback, monitoring, coordination and interaction among all units in the system;

a starting battery 110 comprising a conventional rechargeable battery unit or other type of E.S.D. such as super capacitor intended to start the engine unit 100 or supply power to peripheral equipment; the item may or may not to be installed depending on requirement;

the manual control interface 107 comprising solid-state or electromechanical devices, or chips, and related software to receive inputs for manual control in order to control the present series-parallel dual power hybrid driving system;

a transmission unit 109 comprising any types of automatic, semi-automatic or manual transmission units and to be installed between the shaft of the engine unit 100 and the shaft of the first electrical unit 101, or between the shaft of the first electrical unit 101 and the input terminal of the clutch 102, or between the output terminal of the clutch 102 and the shaft of the second electrical unit 103, or between the shaft of the second electrical unit 103 and the load 108. The transmission unit 109 may or may not to be installed depending on requirement;

a electricity storage device unit 106 comprising by rechargeable battery or super capacitors for storing electrical energy from first electrical unit 101 function as generator driven by engine unit 100, or to store electrical energy from the second electrical unit 103, the electrical energy form E.S.D. unit 106 could be transferred for driving the first electrical unit 101 or the second electrical unit 103 functioning as motor or other electrical driven loadings.

a load unit 108 for the present serial-parallel dual power hybrid driving system, is the loading installed by demand which requires power from rotary electrical machinery for operating the land, maritime, airborne vehicles or industrial equipment.

The present serial-parallel dual power hybrid driving system has at least the following primary functions:

the clutch 102 is not coupled when the load 108 is in light or medium loading state; the engine unit 100 running in high efficiency region to drive the first electrical unit 101 functioning as the generator to generate electricity; under the control of drive control unit 104, the electricity produced by the generator formed by the first electrical unit 101 drives the motor formed by the second electrical unit 103 which further drive the load 108, in the form of a series connected hybrid driving configuration with less power demanding, and the E.S.D. units is isolated from the system under this mode; and the clutch 102 is closed, and the load 108 is driven directly by the kinetic energy outputted from the engine unit 100;

The clutch unit 102 is not closed, and the electricity from E.S.D. unit 106 drives the second electrical unit 103 to function as a motor for further driving the load 108;

The clutch unit 102 is not closed, and the E.S.D. unit 106 also jointed the operation of series hybrid driving configuration for driving the load 108, the engine unit 100 simultaneously running in high efficiency region for driving the first electrical unit 101 to function as generator for supplying power to the second electrical unit 103 to function as motor for load driving, or part of the generated energy is transferred for charging the E.S.D. unit 106, or the electricity form E.S.D. unit 106 jointly drive the second electrical unit 103 to maintain the engine unit 100 running in high efficiency region.

Furthermore, the present series-parallel dual power hybrid driving system has the following functions which are optional:

The clutch unit 102 is not closed, with the electricity form E.S.D. unit 106 and the first electrical unit 101 to jointly drive the second electrical unit 103 for driving the load 108;

The clutch unit 102 is closed, with the power from engine unit 100 to directly drive the load 108, the engine driven first electrical unit 101 is functioning as generator with partial of the generated electricity transferred for charging the E.S.D. unit 106 and keeping the engine unit 100 running in high efficiency region;

The clutch unit 102 is closed, with the electrical energy from E.S.D. unit 106 for driving one or both of the first electrical unit 101 or second electrical unit 103 to functioning as motor to drive the load 108 jointly with engine unit 100;

The engine unit 100 drives the first electrical unit 101 to function as generator for charging E.S.D. unit 106 or driving other electrically-driven loading;

The E.S.D. units supplying the power for driving other electrically-driven loading;

During the break operation, if the clutch unit 102 is closed, one or both of the first or second electrical units 101 and 103 operating as generator for charging the E.S.D. unit 106 or the engine starting E.S.D. 110 or supplying power for driving other electrically-driven loading, or attaching some electrical-driven load for achieving the function of regenerative breaking;

During the break operation, if the clutch unit 102 is open, the second electrical units 103 operating as generator for charging the E.S.D. unit 106 or the starting E.S.D. 110 or supplying power for driving other electrically-driven loading, or attaching some electrical-driven load for achieving the function of regenerative breaking.

The application of the power from E.S.D. unit 106 of the present series-parallel dual power hybrid driving system further includes:

The clutch unit 102 is opened, The E.S.D. unit 106 shall replace the starting battery 110. With the energy from E.S.D. unit 106 to driver the first electrical unit 101 to function as starting motor for starting the engine unit 100.

Figure 2:
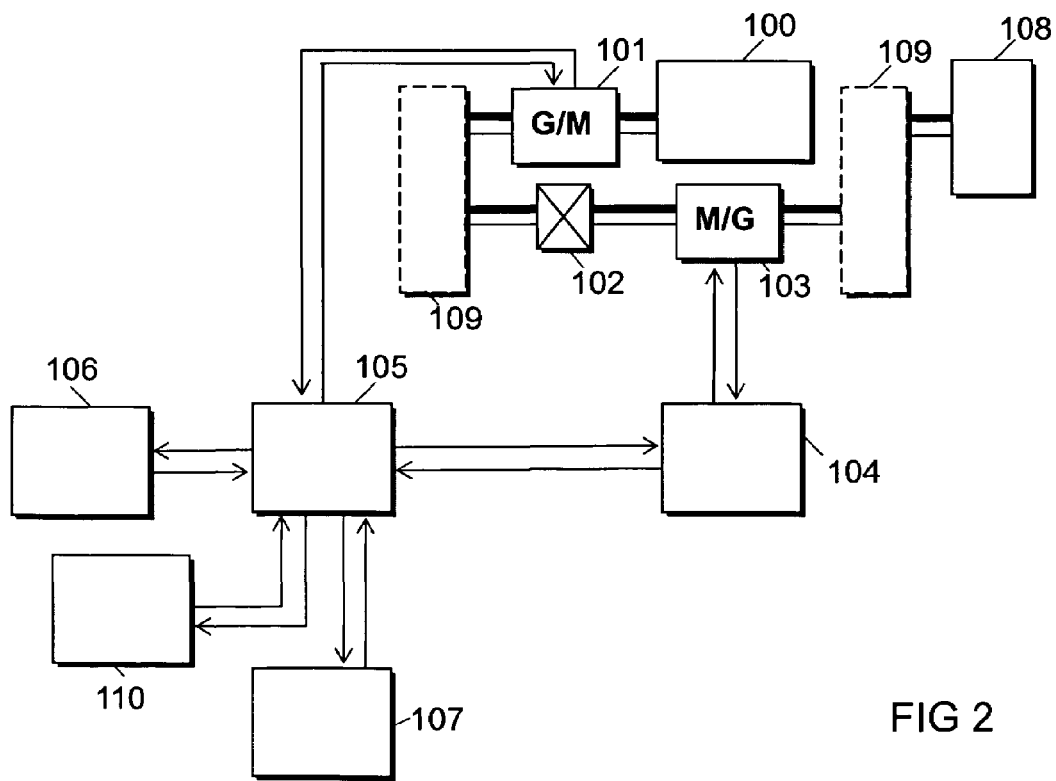
FIG. 2 is another block chart of the preferred embodiment of the present invention.

Now referring to FIG. 2 for another block chart of the preferred embodiment of the present invention, the shaft of the engine unit and the shaft of the second electrical unit are arranged in parallel configuration. For the flexibility of spatial arrangement, the output shaft of engine unit 100 and the output shaft of the second electrical unit 103 could be arranged in parallel configuration without changing the operating feature of present invention.

In short, the present invention is related to an innovation characterized by integrating the advantage of a series-connected hybrid driving system and the advantage of a parallel-connected hybrid driving system. Not only does it enable an engine running with high power and high speed to drive a load through its parallel-connected hybrid driving system. With the deployment of E.S.D for energy storing and transferring to drive the first or second electrical unit to function as motor, especially while the load 108 is driven under a low-power, low-speed light loading condition, the system is operating in series hybrid driving configuration with less power demanding to keep the engine unit 100 running in high efficiency operating region, with the power from engine unit 100 to drive the first electrical unit 101 to function as generator, with the electricity from the first electrical unit 101 transferred to the second electrical unit 103 to function as motor for load driving to form a less-power consuming series hybrid driving configuration, under this configuration the E.S.D. unit isolated from the operation of system, therefore reducing the requirement of E.S.D. capacity for reducing the cost, weight and volume of E.S.D., and refining the drawback—low efficiency and high pollution in low-power, low-speed driving of engine. The present invention is innovative, and the functions it puts forth are definite; and this application is duly filed for examination.

The invention claimed is:

1. A hybrid drive system for driving a load, comprising:
   an internal combustion engine having a rotary power output end, the engine being operable in a plurality of rotation speed ranges, including a high efficiency lower speed range and a high speed range;
   drive train means for selectively coupling the engine to the load, the drive train means including
      a first electrical unit having input and output rotary ends, the rotary power output end of the engine being coupled to the input rotary end of the first electrical unit,
      a second electrical unit having input and output rotary ends, the output rotary end of the second electrical unit being coupled to the load, and
      a clutch having input and output rotary ends, the input rotary end of the clutch being coupled to the output rotary end of the first electrical unit and the output rotary end of the clutch being coupled to the input rotary end of the second electrical unit,
   an electric storage device; and
   control means for selectively engaging or disengaging the clutch to selectively couple the rotary power output end of the engine to the load or isolate the rotary power output end of the engine from the load, and for selectively connecting the electric storage device electrically to one, both, or neither of the first and second electrical units, to permit the hybrid drive system to be operated in a plurality of operating modes, including a first mode in which the clutch is engaged when the load is being driven by the engine while the engine is operating in its high speed range, a second mode in which the engine is operated in its high efficiency lower speed range with the clutch disengaged and with the second electrical unit being operated as a motor and the first electrical unit being operated as a generator that supplies electrical power to the second electrical unit, the electric storage device being isolated from the second electrical unit in the second mode, a third mode in which the engine is operated in its high efficiency lower speed range with the clutch disengaged and with the second electrical unit being operated as a motor that receives power from the electric storage device and that simultaneously receives power from the first electrical unit operating as a generator, and a fourth mode in which the clutch is disengaged and the second electrical unit is operated as a motor to drive the load using electricity supplied by the electric storage device.

2. The hybrid drive system of claim 1, wherein the drive train means further comprises at least one transmission unit.

3. The hybrid drive system of claim 1, further comprising a battery for starting the engine.

4. The hybrid drive system of claim 1, wherein the operating modes further include a mode in which the engine is started with electricity supplied by the electric storage device.

5. The hybrid drive system of claim 1, wherein the operating modes further include a mode in which the clutch is engaged and the electric storage device supplies electricity to at least one of the first and second electrical units to help the engine drive the load.

6. The hybrid drive system of claim 1, wherein the operating modes further include a mode in which at least one of the electrical units is operated by the power of the engine as a generator to charge the electric storage device.

7. The hybrid drive system of claim 1, wherein the drive system is installed in a vehicle, and wherein the operating modes further include a regenerative braking mode in which the clutch is disengaged during braking of the vehicle and the second electrical unit is operated as a generator to charge the electric storage device.

* * * * *